United States Patent
Boussac et al.

(10) Patent No.: US 6,993,461 B1
(45) Date of Patent: Jan. 31, 2006

(54) SWEPT VOLUME MODEL

(75) Inventors: Stephane Boussac, Issy les Moulineaux (FR); Denis Capot-rey, Paris (FR); Laurent Juge, Rueil-Malmaison (FR)

(73) Assignee: Dassault Systemes, (FR)

(*) Notice: Subject to any disclaimer, the term of this patent is extended or adjusted under 35 U.S.C. 154(b) by 0 days.

(21) Appl. No.: 09/329,889

(22) Filed: Jun. 10, 1999

(51) Int. Cl.
*G06F 7/50* (2006.01)

(52) U.S. Cl. .......................... 703/2; 345/421; 345/424

(58) Field of Classification Search .................... 703/7, 703/6, 8, 2; 700/182, 90, 57, 178, 255, 184, 700/173; 345/424, 810, 419, 421; 451/127; 409/13; 123/46 H, 261, 590
See application file for complete search history.

(56) References Cited

U.S. PATENT DOCUMENTS

| | | | |
|---|---|---|---|
| 4,785,399 A | 11/1988 | Evans et al. .................. 364/300 |
| 4,833,617 A * | 5/1989 | Wang ........................... 700/173 |
| 4,888,707 A | 12/1989 | Shimada ...................... 364/513 |
| 5,044,127 A | 9/1991 | Ryan ............................ 51/287 |
| 5,116,173 A | 5/1992 | Goldrich ....................... 409/13 |
| 5,122,966 A | 6/1992 | Jansen et al. .............. 364/474.2 |
| 5,159,512 A | 10/1992 | Evans et al. ................. 395/119 |
| 5,343,385 A | 8/1994 | Joskowicz et al. ..... 364/167.01 |
| 5,351,196 A | 9/1994 | Sowar et al. .......... 364/474.24 |
| 5,542,036 A | 7/1996 | Schroeder et al. .......... 395/124 |
| 5,710,709 A * | 1/1998 | Oliver et al. ................ 700/184 |
| 6,044,306 A | 3/2000 | Shapiro et al. ............... 700/90 |
| 6,099,573 A * | 8/2000 | Xavier ........................... 703/7 |

OTHER PUBLICATIONS

Xavier, P.G., "Fast swept- volume distance for robust collision detection", International Conference on robotics and Automation, Apr. 1977.*
Xavier, P.G., "A generic algorithm for constructing hierarchical representations of geometric objects", International Conference on Robotics and Automation, Apr., 1996.*
Abrams et al., "Swept volumes and their use in viewpoint computation in robot workcells", IEEE International Symposium on Assembly and Task Planning, Aug. 1995.*

* cited by examiner

*Primary Examiner*—Kevin J. Teska
*Assistant Examiner*—Kandasamy Thangavelu
(74) *Attorney, Agent, or Firm*—James V. Mahon; Clifford Chance US LLP

(57) ABSTRACT

A method and apparatus of modeling a swept volume for a computer simulated object by generating a polyhedral representation of the object and representing motion of the object with a set of position matrices. A subset of free neighborhood entities can be determined for each matrix and traces of the motion of the free neighborhood entities can be generated. A representation of the swept volume from the traces is constructed. Free neighborhood entities can include for example, an edge or a triangle. A free neighborhood can be represented by an angular portion for different types of entities comprising the boundary of the polygon, a material zone represented by a half sphere containing material of the object and delimited by a plane of a triangle, or a free neighbor hood including a tangent zone represented by two portions of a sphere, wherein the two portions of the sphere are delimited by planes of adjacent triangles.

11 Claims, 19 Drawing Sheets

Selection of edges and their traces
in first zone

Traces of the edges

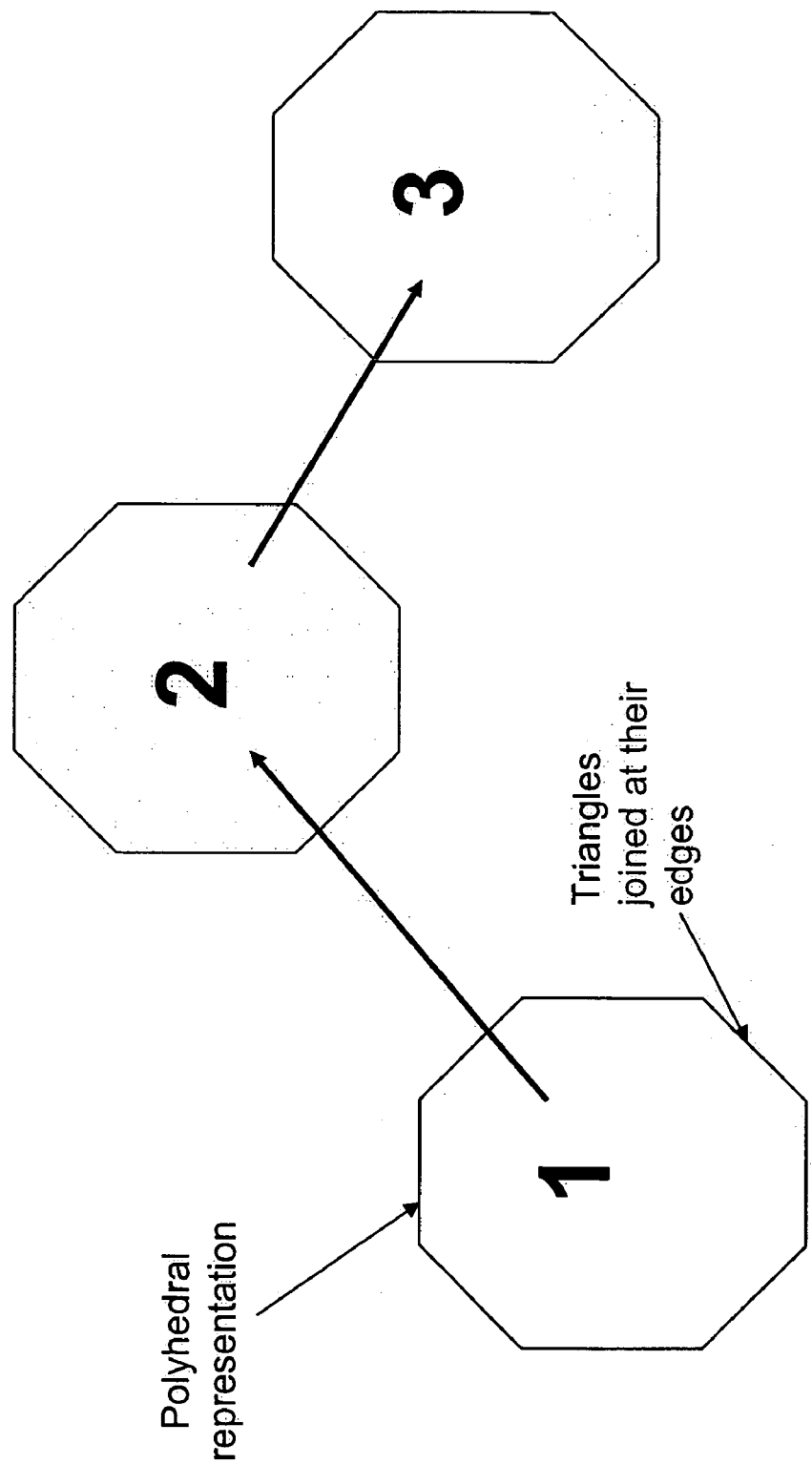

SWEPT VOLUME MODEL

BACKGROUND

The present invention relates to computer software utility programs, and more specifically to a machine and method for producing a swept volume model in computer aided design and computer aided manufacture (CAD/CAM) software systems.

While using CAD/CAM applications it is often desirable to model the spatial inclusion or total volume a moving part will occupy during travel. The spatial inclusion of a moving part can be referred to as the swept volume. It is useful to determine the envelope or boundaries of a swept volume in order to design in adequate clearances for a part. Clearances are necessary, for example, to avoid unanticipated contacts of a part in motion with surrounding objects. In addition, accurate modeling of a swept volume allows for efficiency in terms of space cost. It is often useful to design a feature as compact as possible.

In some currently available systems, parts in motion can be modeled using multi-instantiation of the moving object. This technique produces models of a part at several instants during the part motion. As the number of instantaneous models produced increases the smoother a transition from one model to the next. Acceptable quality using these techniques tends to be processor intensive, requiring the creation of multiple images of the part.

Another technique uses multi-instantiation of a moving object combined with Boolean operations. This technique improves on the straight multi-instantiation model by allowing for extrapolation from one instantaneous model to another. The extrapolation can smooth the surface representation of the resultant model. However this modeling technique still involves creation of multiple instantaneous models and requires intensive processing.

Other approaches include use of voxel representation of a swept volume or use of a marching cubes algorithm.

SUMMARY OF THE INVENTION

Accordingly, the present invention provides a method and apparatus of modeling a swept volume for a computer simulated object.

In general in one aspect the invention includes generating a polyhedral representation of a computer modeled object and representing motion of the object with a set of position matrices. With this invention a subset of entities [free neighborhood entities] can be determined for each matrix and traces of motion of the [free neighborhood] entities can be generated. A representation of the swept volume from the traces can be constructed. The [Free neighborhood] entities can include for example, an edge or a triangle.

Free neighborhood is an area in which an entity can move, while remaining on the swept volume boundary.

When an edge of a three dimensional polyhedron moves within two portions of a sphere limited by planes of adjacent triangles that meet at the edge, the sphere being outside the material of the object and adjacent to the object, it is in an area in which the edge can move while remaining on the swept volume boundary. Such portions of the sphere are called tangent zones. When a triangle of a three dimensional polyhedron moves within the material of the object which is limited by a plance of the triangle and the half sphere containing the material of the object, the half sphere defined by the circumscribing circle of the triangle, the triangle is in a space in which the triangle can move while being on the swept volume boundary. Such space is called material.

Free neighborhood of a polyhedral object includes tangent zones and material zones, traced by some of the edges and triangles of the polyhedron signal free neighborhood entities. The swept volume of a polyhedral object can be defined by the traces of selected edges and selected triangles where such edge and triangle selection is determined based on an analysis of movement of edges and triangles through tangent zones and material zones.

Generally, another aspect includes a polyhedral representation with two triangles representing translational motion of an edge. Polyhedral representation can also include four triangles representing translational and rotational motion of an edge.

In another embodiment, an entity comprising an object and moving inside the material path of the object is filtered, allowing efficiency of processing.

This invention can also embody a computer system, a programmed computer, a computer program residing on a computer-readable medium or a method of interacting with a computer and embodying the concepts described above.

The details of one or more embodiments of the invention are set forth in the accompanying drawings and the description below. Implementations can provide advantages such as the capability of efficiently producing a computer model of the spatial inclusion or total volume a moving part will occupy during travel. Other features, objects, and advantages of the invention will be apparent from the description, the drawings and the claims.

BRIEF DESCRIPTION OF THE DRAWINGS

FIGS. 6A–6H illustrate a process for the computation of a swept volume.

DETAILED DESCRIPTION OF THE INVENTION

Figure 1:
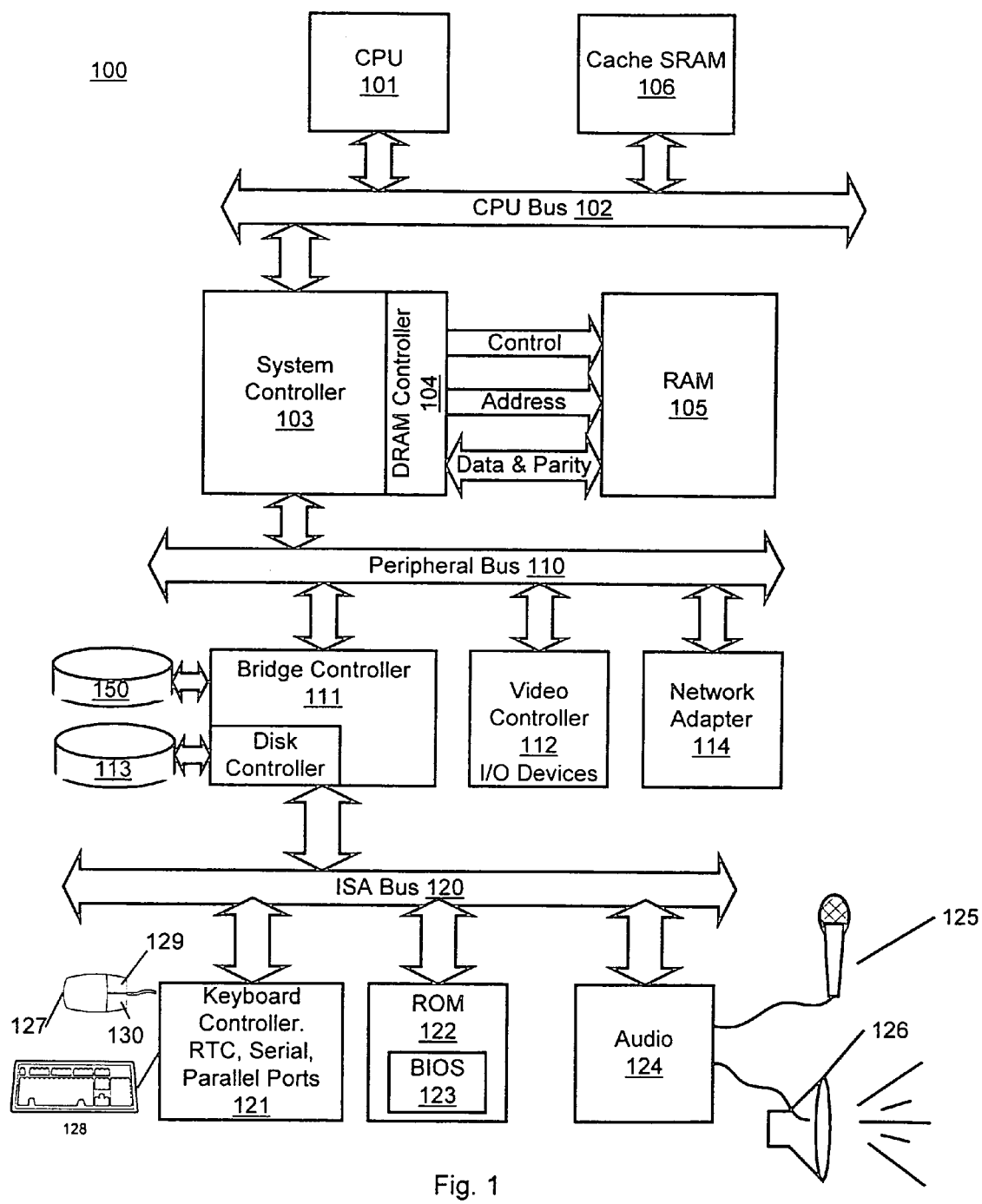
FIG. 1 is an illustration of a computer conforming to this invention.
Figure 2:
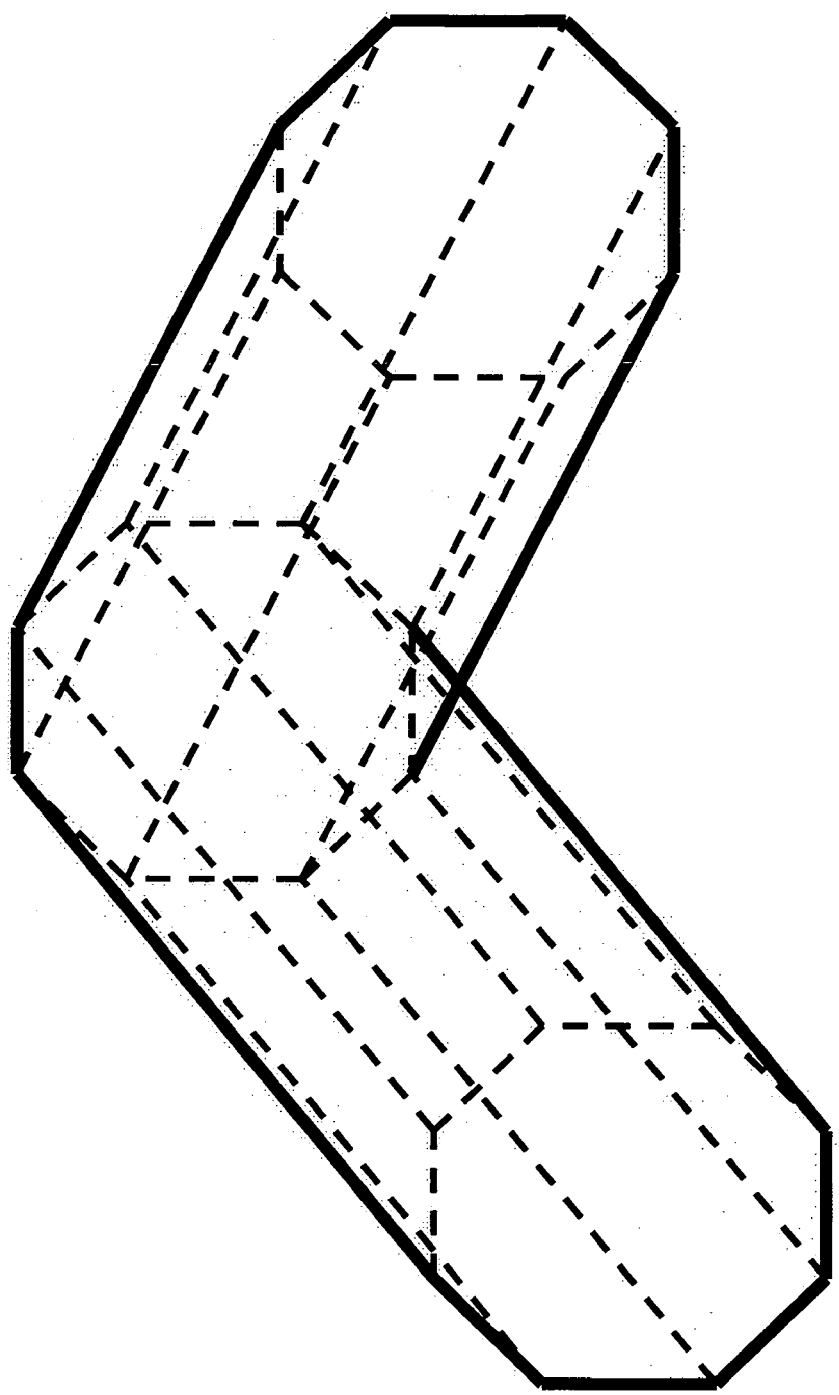
FIG. 2 illustrates a swept volume calculated in accordance with the process illustrated in FIGS. 6A–6H.

Referring to FIG. 1 physical resources of a computer system 100 are depicted. The computer 100 has a central processor 101 connected to a processor host bus 102 over which it provides data, address and control signals. The processors 101 may be any conventional general purpose single-chip or multi-chip microprocessor such as a Pentium® series processor, a K6 processor, a MIPS® processor, a Power PC®processor or an ALPHA®processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 114, a video display controller 112 coupled to a video display 115, and a keyboard and mouse controller 113 can be coupled to a peripheral bus 110 and controlled by the processor 101. The computer system can include a connection to a computer system network, an intranet or an internet. Data and information may be sent and received over such a connection.

The computer 100 can also include non-volatile ROM memory 107 to store basic computer software routines. ROM 107 may include alterable memory, such as EEPROM (Electronically Erasable Programmable Read Only Memory), to store configuration data. BIOS routines 123 can be included in ROM 107 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, UNIX™, LINUX, the Apple MacOS™ operating system, or other operating system.

An operating system may be fully loaded in the RAM memory 105 or may include portions in RAM memory 105, disk drive storage 114, or storage at a network location. The operating system can provide functionality to execute software applications, software systems and tools of software systems. Software functionality can access the video display controller 112 an other resources of the computer system 100 to provide two dimensional (2-D) and three dimensional (3-D) models on the video computer display 115.

Motion can be simulated on a model by selection from a user menu or other interactive device, such as an icon, or a command line entry. A user can specify a motion type such as rotation, linear motion, or arced motion, and then select a model object to impart the motion to. Another option includes selecting an object and then selecting a motion to impart to the object. Selection can be effected with a pointing device, keyboard, stylus pen, touchscreen or other user entry device.

In another embodiment, motion data can be stored in a database and later referenced to simulate the motion relating to the data. Data included in the database can be compiled from actual experiments or other real world collection methods. For example, sensors attached to the wheel of a car can monitor rotational speed and vertical motion as the car is driven. The data collected from the sensors can be stored in a database. The database can be referenced by a computer defined model to emulate the motion of the wheel. In this manner, most movements occurring in nature that can be monitored can be emulated by the computer model. In addition, data can be entered manually through an input device such as a keyboard or otherwise compiled. The computer defined model can emulate motion represented by the data.

To represent a swept volume the present invention can determine the boundaries of the volume, i.e. a set of surfaces (2-D entities) that close the volume. This boundary or envelope can be calculated in a computer defined model. At a time t, a point belonging to a boundary of a moving object belongs to the boundary of the swept volume, [if its neighborhood with respect to the swept volume is not full, that is] if the point is not inside the material of the object. [The neighborhood of a point with respect to the swept volume can be equal to the swept volume generated by the motion of the neighborhood of the point with respect to the moving object.] For a point p, a free neighborhood can be a set of points if [belonging to the neighborhood of p such that] the neighborhood generated from the motion of point p is not inside the material of the object.

A boundary of a swept volume can generally be modeled by determining for each time t a subset of points belonging to the boundary of the moving object and sliding along the boundary of the swept volume. This determination can be based on a study of the free neighborhood of the point. A trace can be computed and generated by the motion of the point. The swept volume can be constructed from representation of multiple traces.

Figure 3:
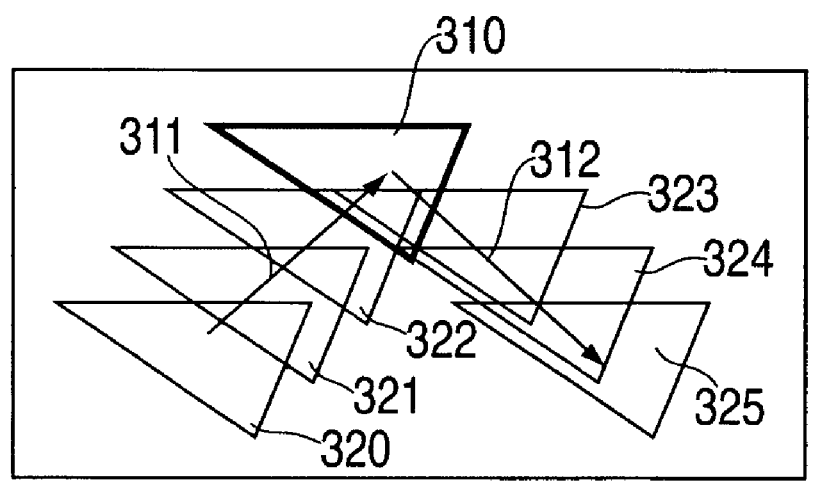
FIG. 3 illustrates an edge in a polyhedral representation traced through a bend.

Referring now to FIG. 3, a triangle 310 representing an edge in a polyhedral representation of an object can be traced through an "elbow" during motion. The trace 300 can include multiple instantiations of the triangle 320–325. The direction of the motion can be indicated by directional arrows 311 and 312. Points can belong to an edge in a 2-D representation, or a triangle in a 3-D representation. Points can have similar neighborhoods and also similar free neighborhoods. Therefore, if one point included in the edge or the triangle entity of the boundary of the moving object is moving inside its free neighborhood, then the entire entity is moving inside its free neighborhood.

Two types of free neighborhood can be utilized in a swept volume computation. The free neighborhood of a triangle can be represented with a half-sphere containing material and delimited by the plane of the triangle. This type of free neighborhood can be referred to as the material zone.

The free neighborhood of an edge can be represented by two portions of a sphere, delimited by the planes of the adjacent triangles. This type of neighborhood can be referred to as a tangent zone.

Figure 4:
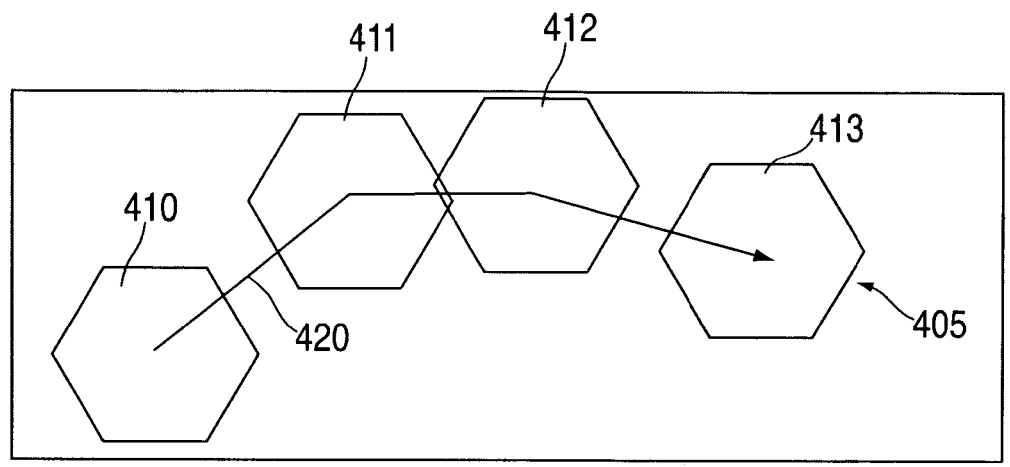
FIG. 4 illustrates a polygon submitted to translation.

Referring now to FIG. 4, a polygon 410 can be subjected to a translation. A trajectory 420 of the translation can be tracked, for example, from a point such as a center point in each instantiation 410–413 of the polygon.

Figure 5:
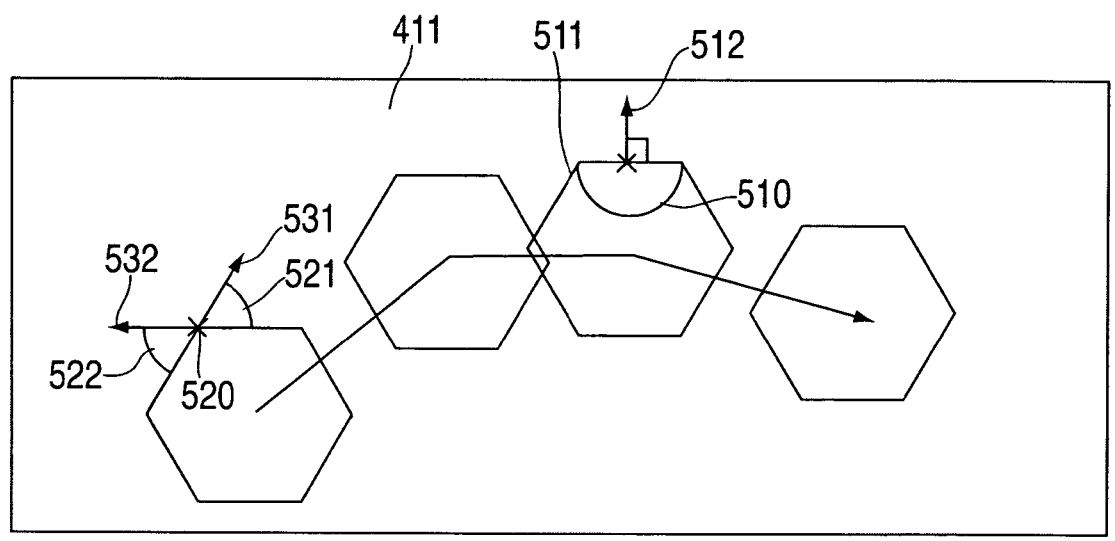
FIG. 5 illustrates Free Neighborhood Tangent and Material zones.
Figure 6B:
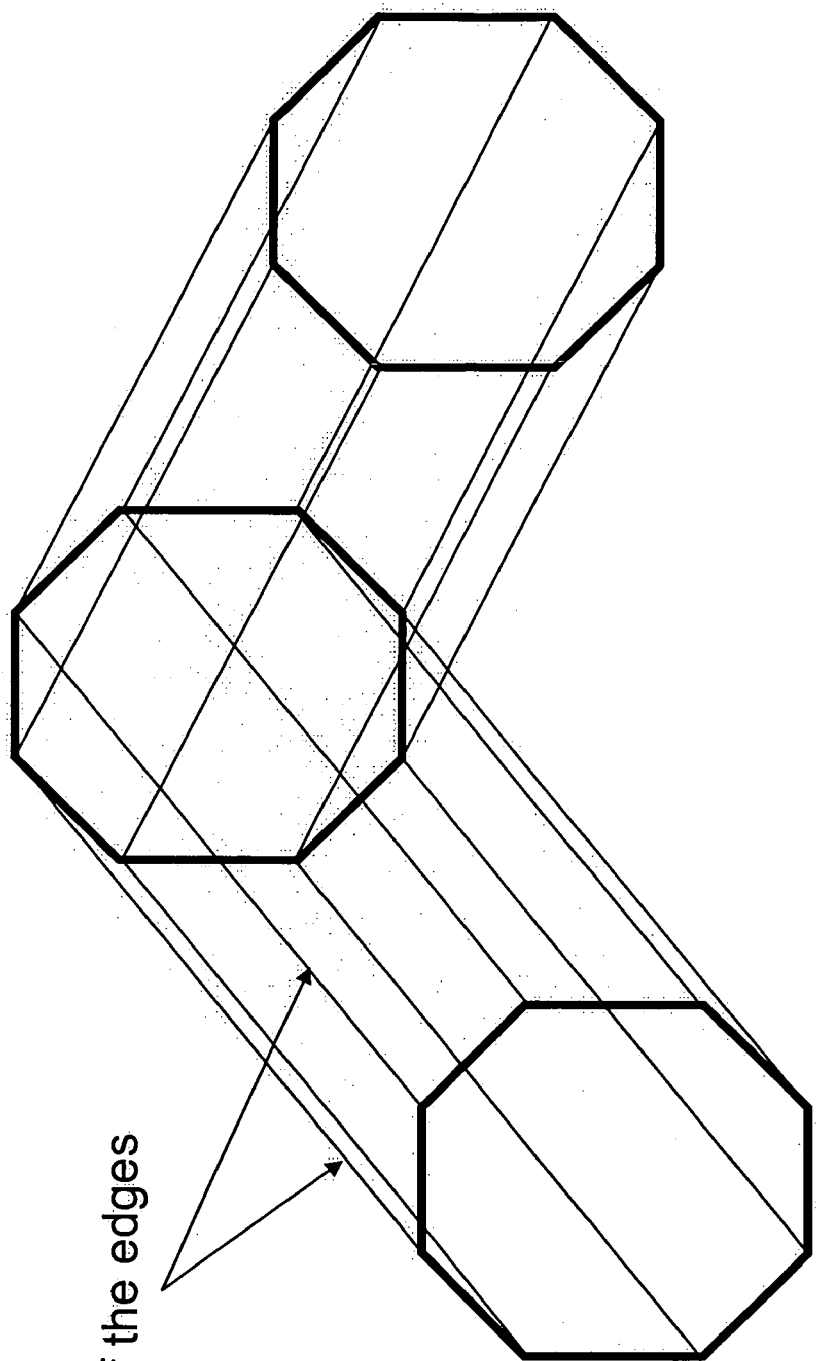
Figure 6C:
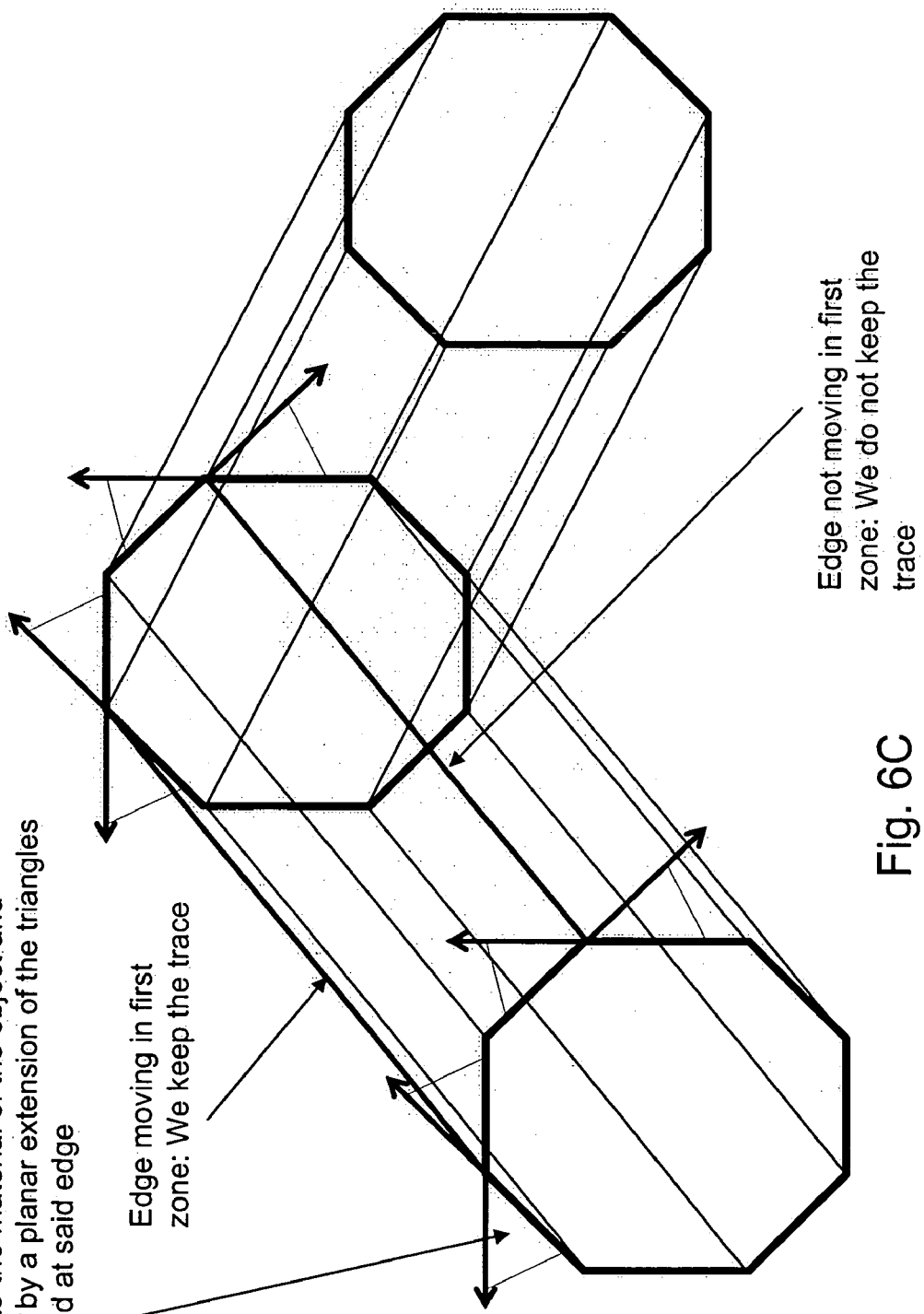
Figure 6D:
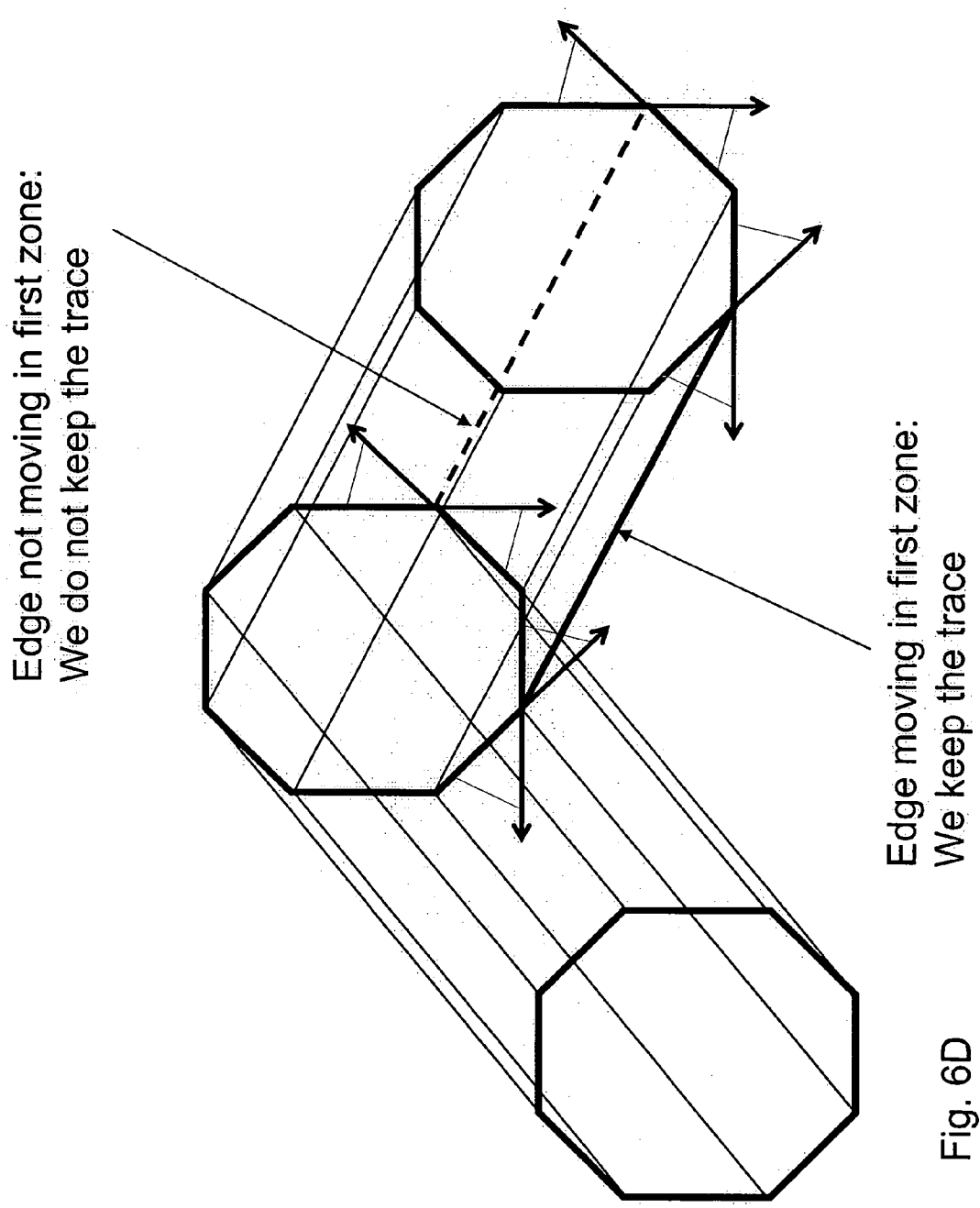
Figure 6E:
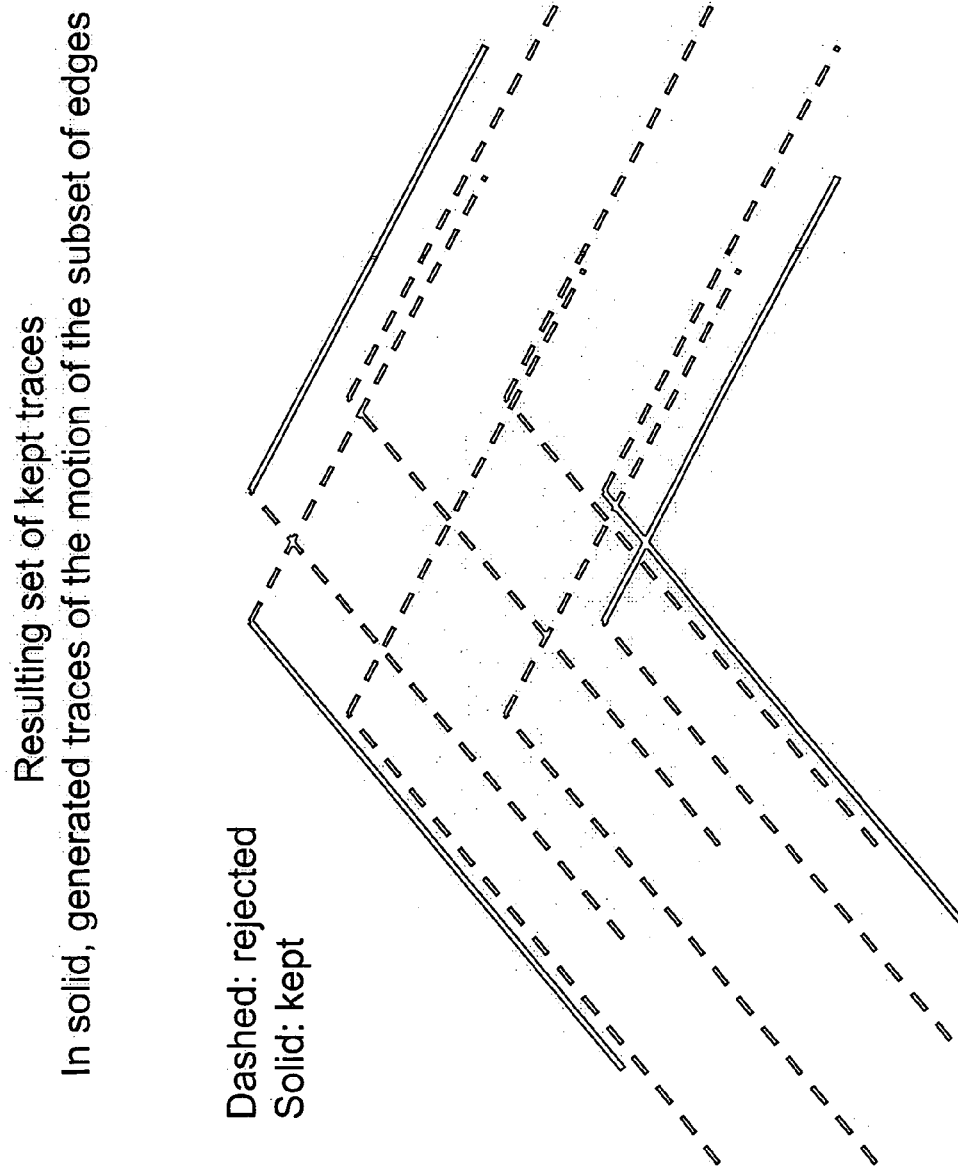
Figure 6F:
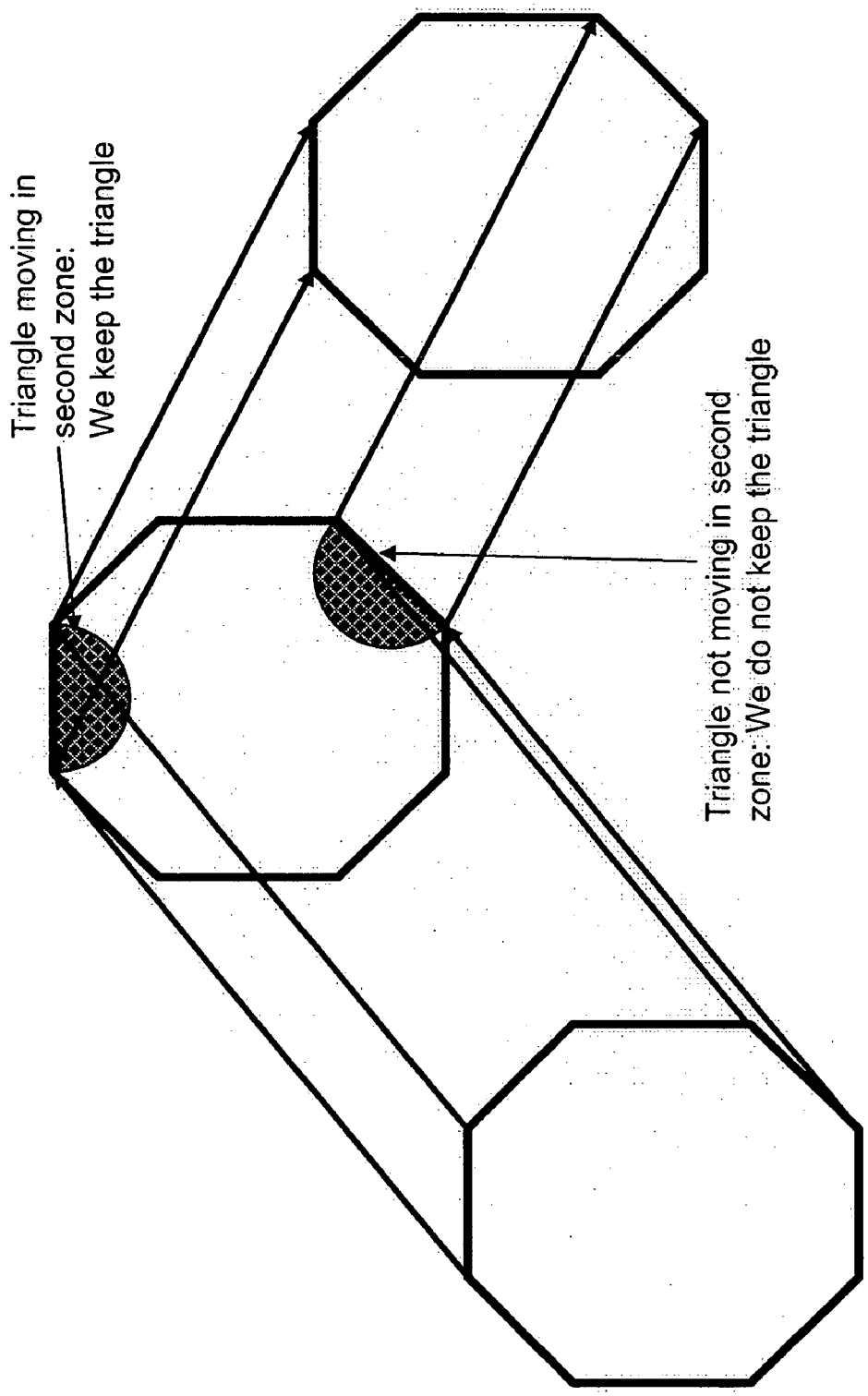
Figure 6G:
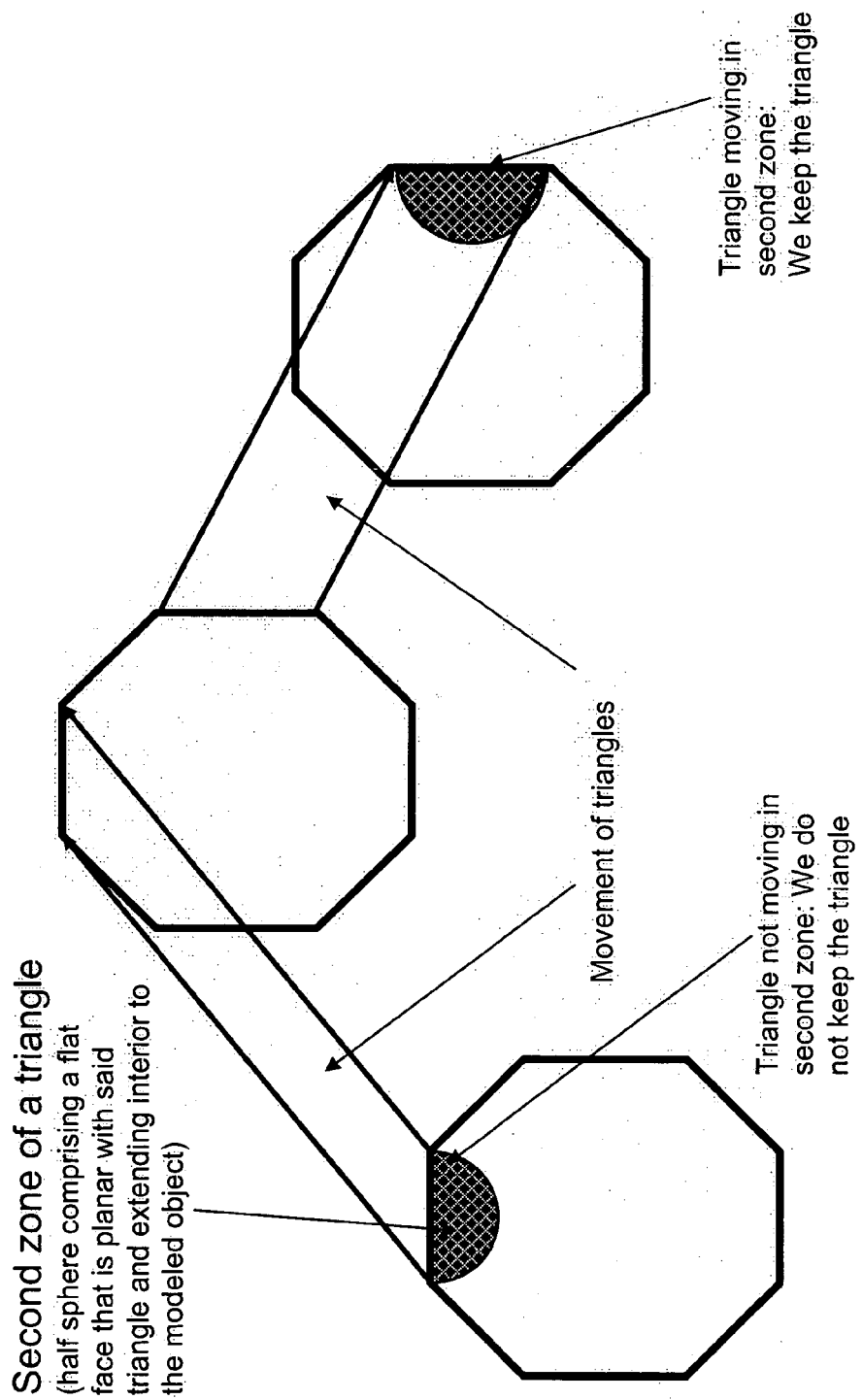
Figure 6H:
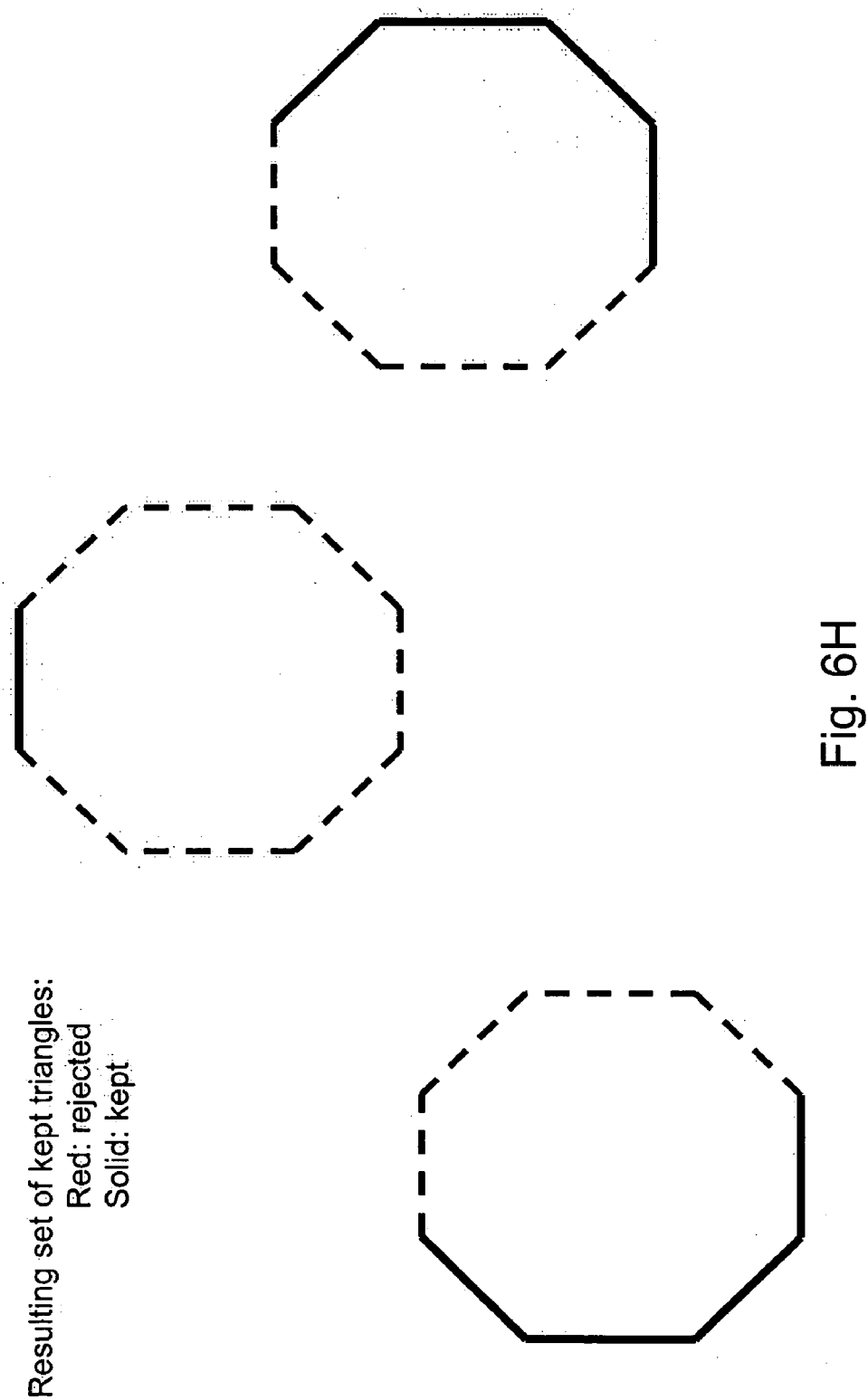

Referring now to FIG. 5, a free neighborhood can be represented by an angular portion of a sphere for edge [for different] types of entities belonging to the boundary of the polygon. Such a free neighborhood can be based on tangent vector[[s]] 531 and side 541 or tangent vector 532 and side 542 of edge [of a point] 520 [with respect to the adjacent edges]. This is a tangent zone. In the case of a triangle, [an edge 511,] a free neighborhood can be based on the plane of the triangle and the half sphere in the material of the object. This is the material zone. [or material zone can be based on the normal vector 512.]

The free neighborhood of a triangle of a 3-D object can be represented by a half sphere 510.

The half sphere 510 can be referred to as a material zone. In the case of an edge, represented in 2-D by a point 520, the free neighborhood can be represented by two portions of a sphere 521 and 522. The spheres can be delimited by the planes of adjacent triangles 531 and 532. The free neighborhood of an edge 521 and 522 can be referred to as a tangent zone.

Referring now to FIG. 6, motion vectors 611–613 can indicate the translation of different entities included in the polygon object. The motion vectors 611–613 can correlate to the trajectory 420 of the polygon object 405. Entities can include, for example, an edge 630, or a triangle 620.

Figure 7:
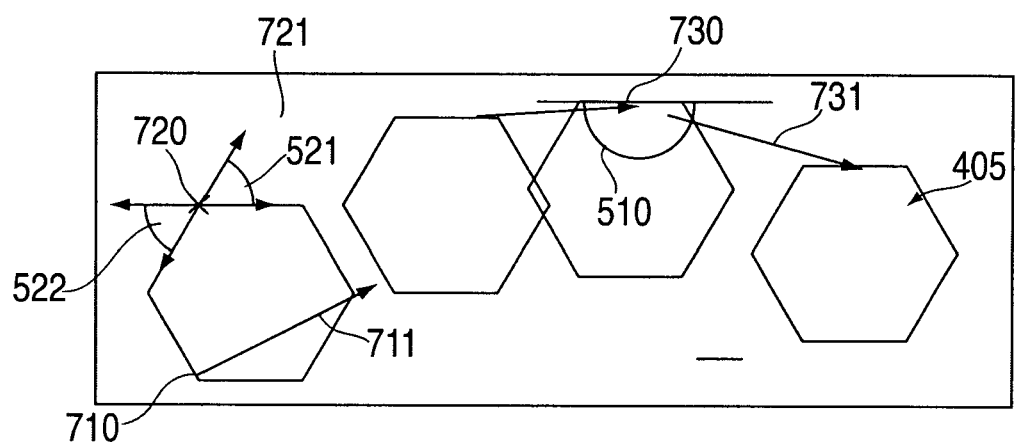
FIG. 7 illustrates tracking of Free Neighborhood entities.

Referring now to FIG. 7, entities remaining on the boundary of the swept volume, can be tracked and included in the computation of the polyhedron forming the swept volume. Those entities that enter inside the path of the material of the polygon object can be filtered out thereby economizing processor power. For example, an edge 720 following a motion vector 721, can travel through a tangent zone 521. Therefore the edge 720 can be tracked and used in a swept volume model. Similarly, triangle 730 translating along vector 731 can travel through a material zone 510. Therefore, triangle 730 can be tracked to determine a swept volume model.

Filters can be applied to parts travelling through a material path of a polygon. Filtering can reduce computations executed by the computer processor 101. For example, edge 710 translating along vector 711 travels through the material path of polygon 405. Therefore edge 710 can be filtered out of a swept volume computation.

Figure 8:
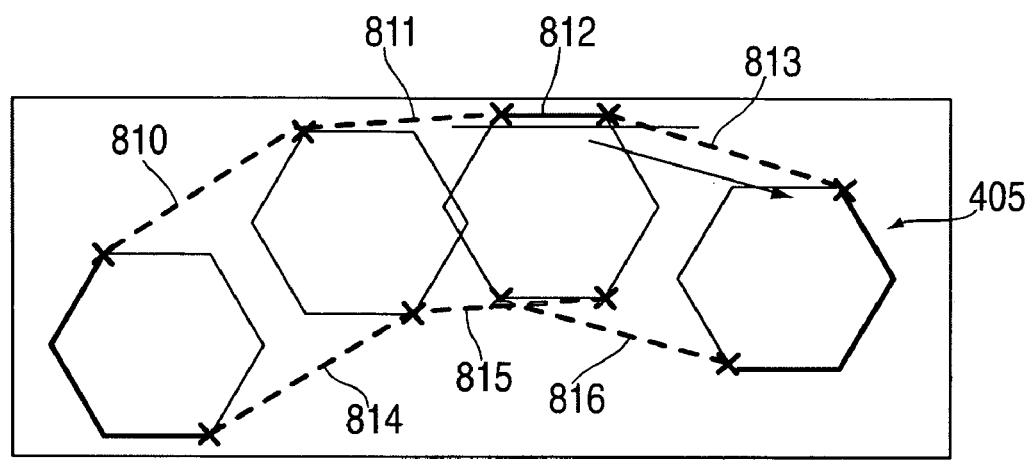
FIG. 8 illustrates tracking translation of a polygon.
Figure 9:
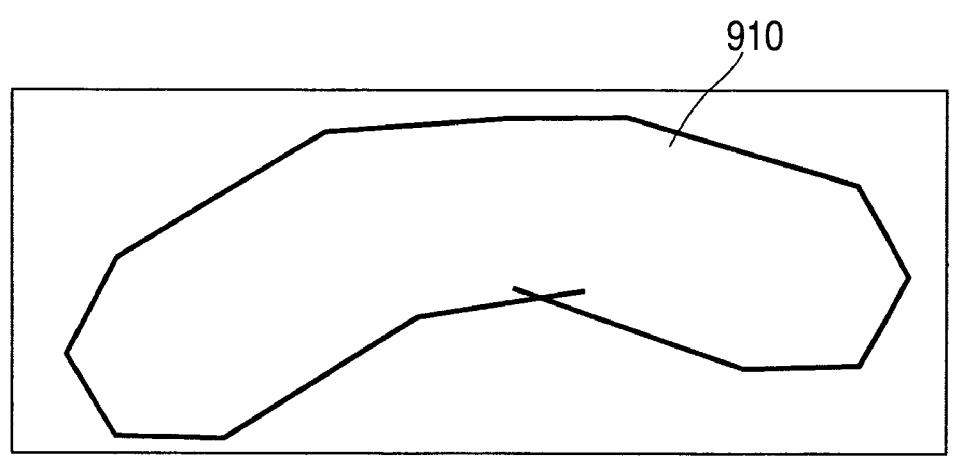
FIG. 9 illustrates forming a swept volume boundary from the translation of FIG. 8.

Referring now to FIG. 8, a set of traces 810–816 tracking a translation of a polygon object 405 can form a swept volume boundary 910 displayed in FIG. 9.

Figure 10:
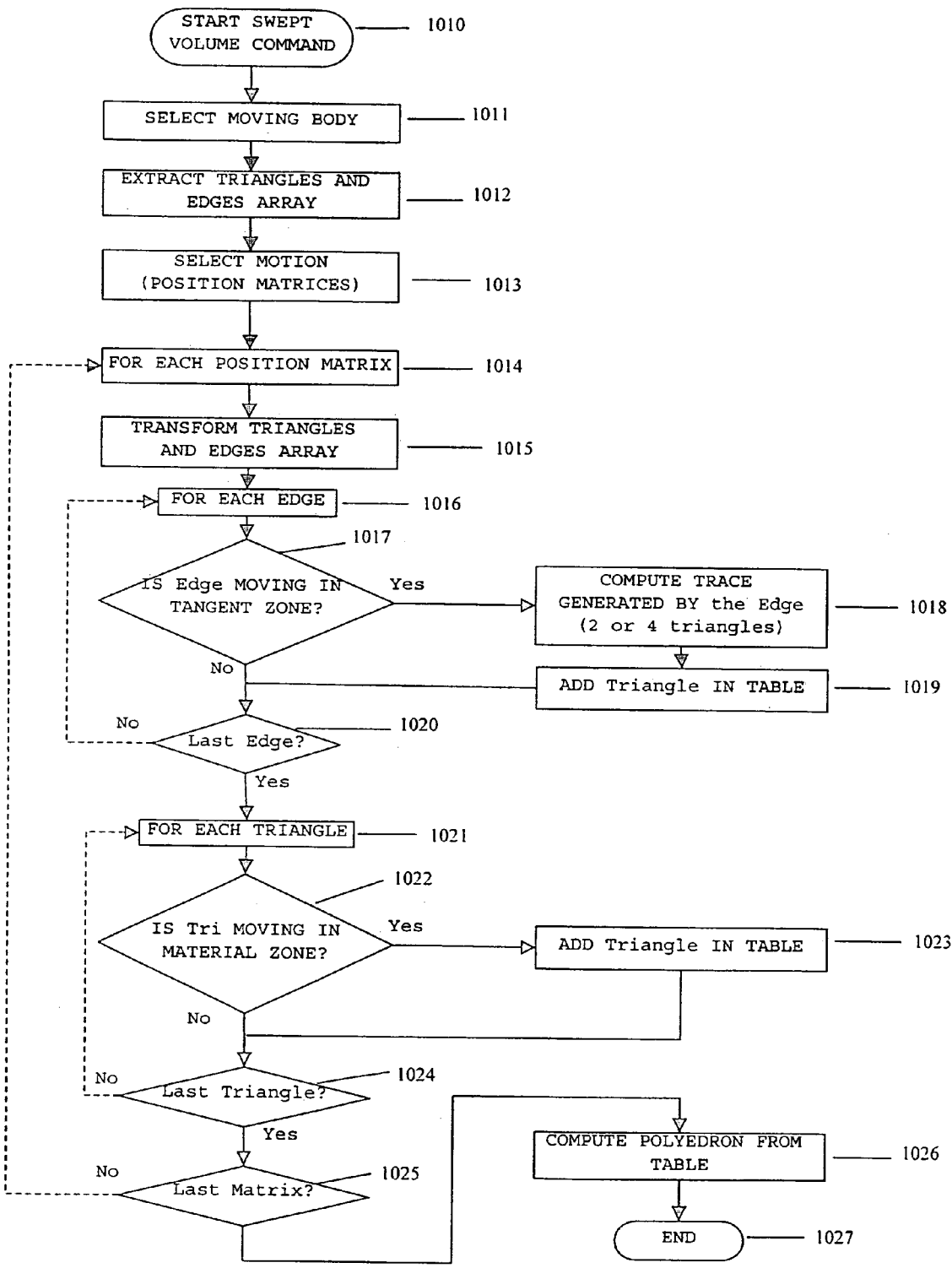
FIG. 10 is a flow chart of one embodiment of a process for swept volume generation.

Referring now to FIG. 10, in one embodiment, a logical flow including the steps 1010–1027 can represent a process used to determine the swept volume generated by a motion of a polyhedral object. A "Start Swept Volume" command 1010 commencing execution of a Swept Volume program can be issued by a user or called from another program executing on a computer 100. A moving body can be selected from a computer generated model display 1011. Selection can be accomplished with a mouse or other pointing device or with an input device such as a keyboard. The program can extract an array of triangles and edges 1012. Extraction can reference stored triangle information and insert it into a diagram without modifying the information.

The motion can be selected through the selection of position matrices 1013. A loop can then be set up for each position matrix 1014. The loop can call for the program to transform the triangles and edges array 1015. A sub-loop can be set up for each edge 1016. Within the edge sub-loop, a test can determine if a current edge is moving in a tangent zone 1017. If a current edge is moving in a tangent zone, the program can compute a trace generated by the edge 1018. In computing the trace generated by the edge 1018, the program can utilize two triangles to represent translation of a polygon and four triangles for motion including translation and rotation of the polygon.

Transformation of the triangles can include modifying the position of the triangles that make up a part, such as the connecting rod. A set order of positions can be defined from select motion position matrices representing the part at different instantiations. In the example of the connecting rod, a triangle on the edge of an array while the connecting rod is at an original position at to can have a position X0, Y0, and Z0. With vertical translation only, the top position of the connecting rod can be at X0, Y0, and Z1 where Z is the vertical axis. Translation can modify the position of each point of each triangle at each edge.

Following computation of a trace generated by the edge 1018, the program can add the triangle to a table 1019. Triangles stored in the table can later be referenced to model a polyhedron representation of the swept volume. The loop can continue for each edge until a last edge has been computed 1020.

A loop for each triangle 1021 can also process. The logical order of the loops is not significant. A loop for triangles can precede a loop for edges, or an edge loop may precede a triangle loop. The loop for each triangle can test for movement of a triangle in a material zone 1022. A triangle moving through a material zone can be added to the table used to compute a polyhedron 1023. The loop for each triangle can continue until the last triangle has been tested 1024.

The matrix loop can continue to transform a triangles and edges array and run edge and triangle sub-loops for each matrix until a last matrix is reached 1025. When all matrices have been processed, the program can compute a polyhedron from information contained in a table into which the triangles have been stored 1026. Finally, a swept volume command program can come to an end 1027.

Figure 11:
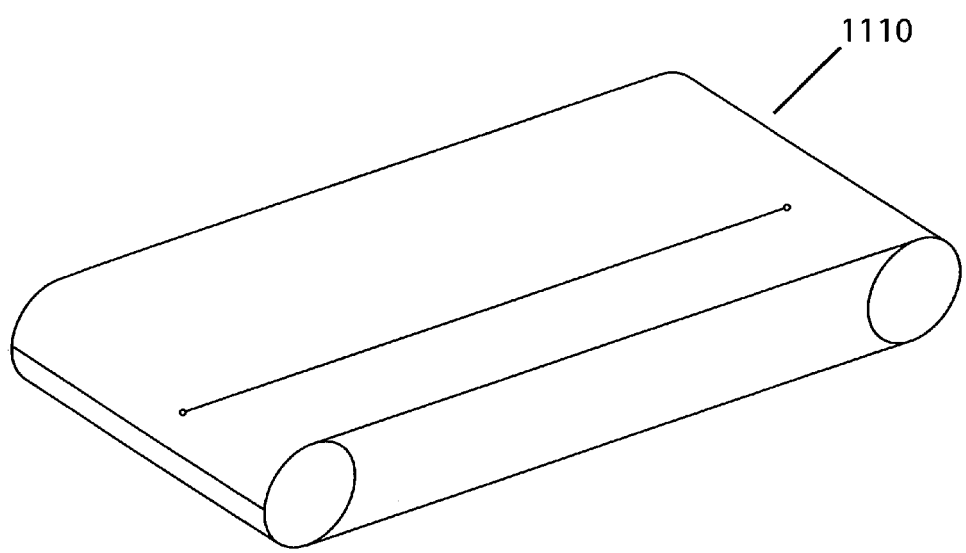
FIG. 11 illustrates a swept volume model of a cylinder experiencing translation.
Figure 12:
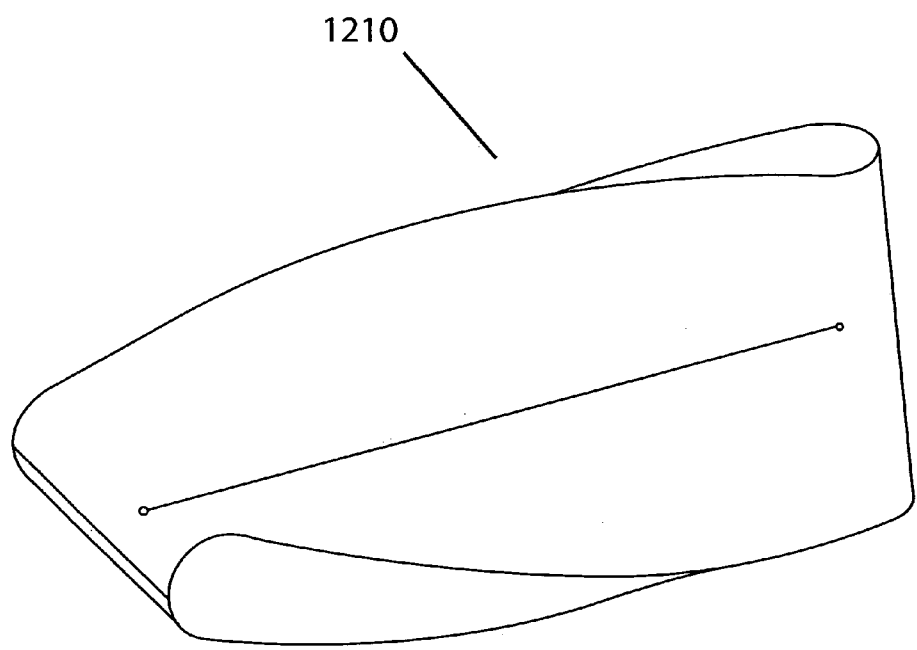
FIG. 12 illustrates a swept volume model of a cylinder experiencing translation and rotation.

Referring now to FIG. 11, a swept volume model generated by translation motion of a cylinder is illustrated 1110. A swept volume model generated by translation and rotational motion of a cylinder is illustrated in FIG. 12 at 1210. FIG. 11 and FIG. 12 illustrate a simple cylinder object experiencing uncomplicated translation and rotational motion patterns.

Figure 13:
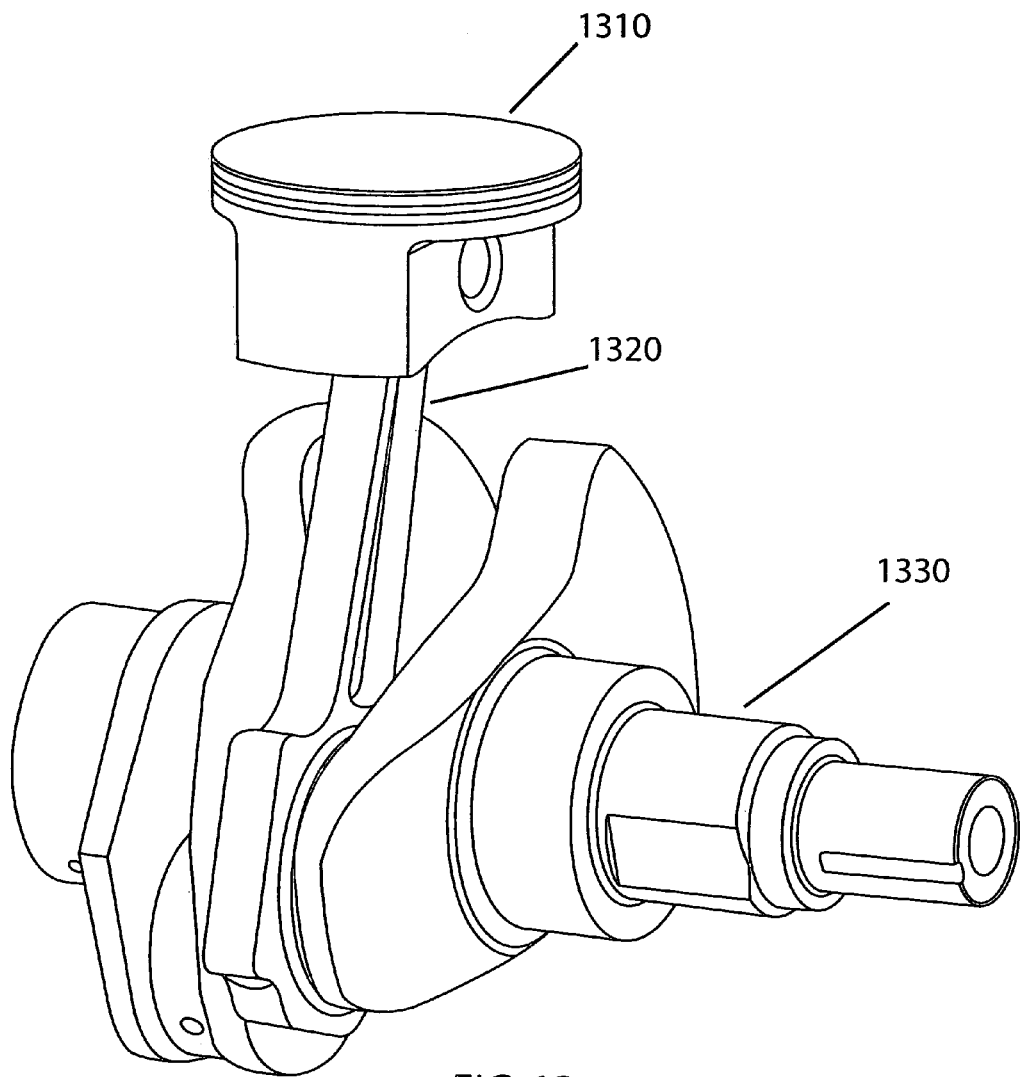
FIG. 13 illustrates a piston, connecting rod and crankshaft at rest.
Figure 14:
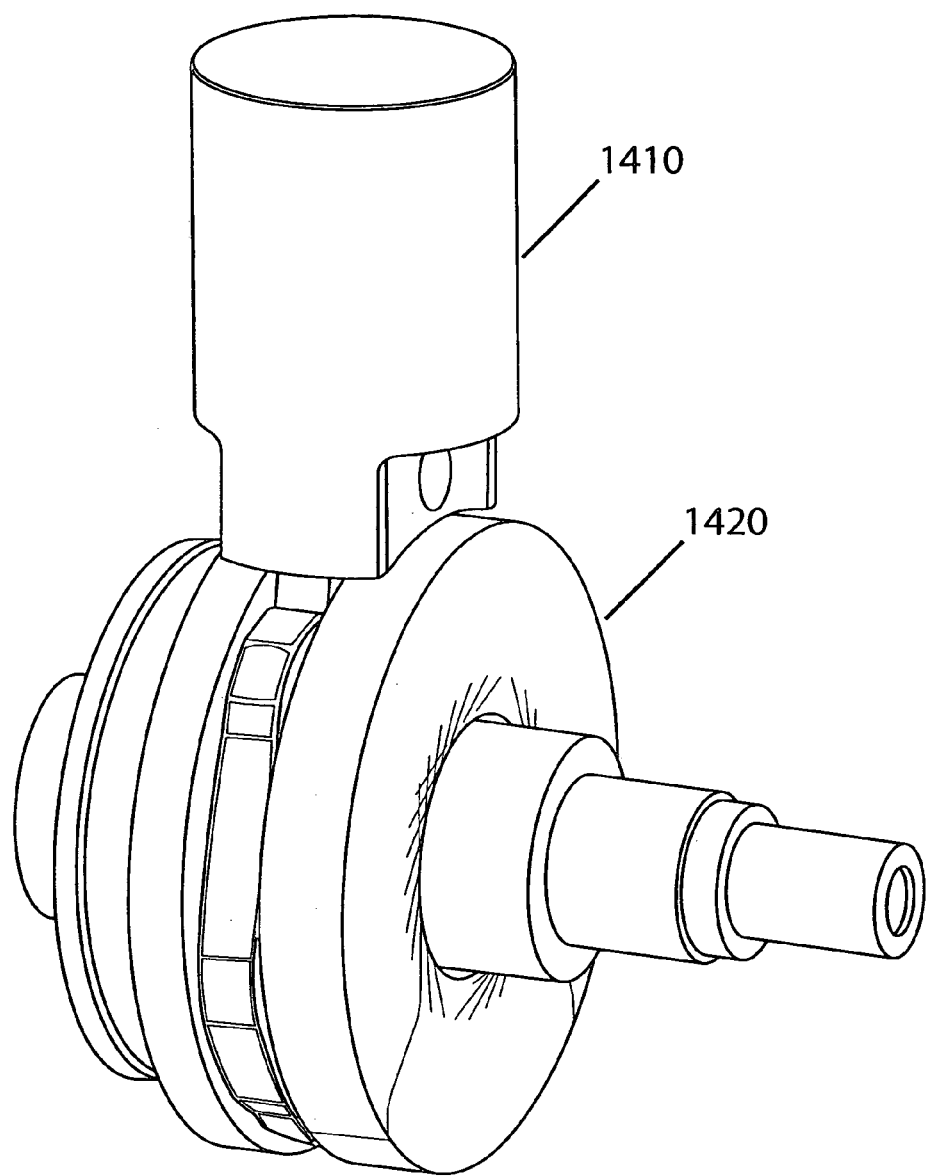
FIG. 14 illustrates a swept volume model of the piston, connecting rod and crankshaft, with the piston and connecting rod showing motion.

Referring now to FIG. 13, an illustration a slightly more complicated model is shown. A piston 1310 is connected to a connecting rod 1320 and a crankshaft 1330 is modeled. Rotation of the crankshaft 1330 can cause translational and rotational movement in the connecting rod 1320 and translational movement in the piston 1310. FIG. 14 illustrates a swept volume model 1410 of the piston 1310 experiencing a translational motion. A swept volume model 1420 is also illustrated for the translational and rotational motion of the connecting rod 1320. Movement of the crankshaft 1330 has not been modeled. A user can select particular objects included in the model and construct a swept volume model for the selected objects only. This select process can provide clarity to the swept volume model in the context of the objects illustrated.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It will be understood that various modifications may be made without departing from the spirit and scope of the invention. Therefore, other implementations are within the scope of the following claims.

What is claimed is:

1. A method for use in calculation of a swept volume of a computer generated model of a real-world object, the method comprising:
    generating a three dimensional polyhedral representation of the model of the real-world object, the representation comprising a plurality of triangles joined at their edges, said triangles forming a tessellated representation of the modeled real-world object;
    representing three dimensional motion of the modeled object by a series of sequential positions of the modeled object in three dimensional space; and
    for each position in the series of sequential positions of the modeled object,
        (i) determining a subset of the edges such that each edge in said subset has a trajectory through a corresponding first zone in which motion of the corresponding edge comprises motion on the boundary of the modeled swept volume during motion of the modeled object from a current position to a next position, where each such edge's corresponding first zone comprising a region external to the material of the modeled object and bounded by a planar extension of the triangles that join at said edge;
        (ii) determining a subset of the triangles such that each triangle in said subset has a trajectory through a corresponding second zone during motion of the modeled object from a preceding position to a current position and from the current position to a next position; and where:
            each such triangle's second zone comprises a zone represented by a half sphere,
            said half sphere comprising a flat face that is planar with said triangle, and
            said half sphere extending interior to the modeled object, and
            said second zone representing a space that had been occupied by at least a portion of the modeled object when the modeled object was positioned at said preceding position;
        (iii) generating a trace of the motion of said subset of edges between said current and said next positions; and
    constructing a representation of the swept volume from the generated traces of the motion of said subset of edges
    wherein constructing a representation of the swept volume further comprises bounding the swept volume at each of said current positions in said series by said subset of triangles associated with each such current position.

2. The method of claim 1 wherein the motion between two consecutive positions of the modeled object is modeled as linear motion.

3. The motion of claim 1 wherein the representation of sequential positions of motion comprise rotational and translational representations.

4. A computer system for use in computing swept volume for a model of a real-world object, the system comprising:
    a processor operatively interconnected to a memory;
    a user input device; a display; and
    a graphical user interface responsive to activation with the user input device by causing a program stored in the memory to be executed by the processor, said program configuring the processor to perform computations whereby:
        (a) a three dimensional polyhedral representation of a computer model of a real-world object is generated, the representation comprising a plurality of triangles joined at their edges, said triangles forming a tessellated representation of the modeled real-world object,
        (b) three dimensional motion of the modeled object is represented with a set of position matrices,
        (c) for each of a series of sequential positions of the modeled object as represented by the matrices,
            (i) a subset of the edges is determined such that each edge in said subset has a trajectory through a corresponding first zone in which motion of the corresponding edge comprises motion on the boundary of the modeled swept volume during motion of the modeled object from a current position to a next position and where each such edge's corresponding first zone comprises a region external to the material of the modeled object and bounded by a planar extension of the triangles that join at said edge,
            (ii) a subset of the triangles is determined such that each triangle in said subset has a trajectory through a corresponding second zone during motion of the modeled object from a preceding position to a current position and from the current position to a next position and where each such triangle's second zone comprises a zone represented by a half sphere, said half sphere comprising a flat face that is planar with said triangle and said half sphere extending interior to a space that had been occupied by at least a portion of the modeled object when the modeled object was positioned at said preceding position,
            (iii) traces are generated by the motion of the subset of edges during motion between a current and a next position; and
        (d) a representation of the swept volume is constructed from the traces of the subset of edges and bounded at each of said current positions in said series by said subset of triangles associated with each such current position.

5. The computer system of claim 4 wherein the position matrices representing motion comprise motion data associated with a real-world object that is collected during physical experiments.

6. A computer program residing on a computer-readable medium, the program comprising instructions which when executed on a computer cause the swept volume of a real world object to be generated, the instructions causing the computer to
  (a) generate a three dimensional polyhedral representation of a computer model of a real-world object, the representation comprising a plurality of triangles joined at their edges, said triangles forming a tessellated representation of the modeled real-world object;
  (b) represent three dimensional motion of the modeled object with a set of position matrices;
  (c) for each of a series of sequential positions of the modeled object as represented by the matrices;
    (i) determine a subset of the edges such that each edge in said subset has a trajectory through a corresponding first zone in which motion of the corresponding edge comprises motion on the boundary of the modeled swept volume during motion of the modeled object from a current position to a next position and where each such edge's corresponding first zone comprising a region external to the material of the modeled object and bounded by a planar extension of the triangles that join at said edge,
    (ii) determine a subset of the triangles such that each triangle in said subset has a trajectory through a corresponding second zone during motion of the modeled object from a preceding position to a current position and from the current position to a next position and where each such triangle's second zone comprises a zone represented by a half sphere, said half sphere comprising a flat face that is planar with said triangle and said half sphere extending interior to a space that had been occupied by at least a portion of the modeled object when the modeled object was positioned at said preceding position, and
    (iii) generate traces of the motion of the subset of edges during motion between a current and a next position; and
  (d) construct a representation of the swept volume from the traces of the subset of edges and bounded at each of said current positions in said series by said subset of triangles associated with each such current position.

7. A method for use in calculation of a swept volume of a computer generated model of a real-world object, the method comprising:
  (a) generating a two dimensional representation of the model of the real-world object, the representation comprising a plurality of edges joined at vertices;
  (b) representing two dimensional motion of the modeled object by a series of sequential positions of the modeled object in two dimensional space; and
  (c) for each position in the series of sequential positions of the modeled object,
    (i) determining a subset of the vertices such that each vertex in said subset has a trajectory through a corresponding first zone in which motion of the corresponding edge comprises motion on the boundary of the modeled swept volume during motion of the modeled object from a current position to a next position and where each such edge's corresponding first zone comprising a region external to the material of the modeled object and bounded by a planar extension of the edges that join at said vertex,
    (ii) determining a subset of the edges such that each edge in said subset has a trajectory through a corresponding second zone during motion of the modeled object from a preceding position to a current position and from the current position to a next position and where each such edge's second zone comprises a material zone represented by a half circle, said half circle comprising a flat face that is aligned along said edge, said edge being elements of a tessellated representation of the modeled real-world object, and said half circle extending interior to a space that had been occupied by at least a portion of the modeled object, when the modeled object was positioned at said preceding position, and
    (iii) generating a trace of the motion of said subset of vertices between said current and said next positions, and
  (d) constructing a representation of the swept volume from the generated traces of the motion of said subset of vertices and edges.

8. The method of claim 7 wherein the motion between two consecutive positions of the modeled object is modeled as linear motion.

9. A method for use in calculation of a swept volume of a computer generated model of a real-world object, the method comprising:
  generating a three dimensional polyhedral representation of the model of the real-world object, the representation comprising a plurality of triangles joined at their edges, said triangles forming a tessellated representation of the modeled real-world object;
  representing three dimensional motion of the modeled object by a series of sequential positions of the modeled object in three dimensional space; and for each position in the series of sequential positions of the modeled object,
    (i) determining a subset of the edges such that each edge in said subset has a trajectory through a corresponding first zone in which motion of the corresponding edge comprises motion on the boundary of the modeled swept volume during motion of the modeled object from a current position to a next position, where each such edge's corresponding first zone comprising a region external to the material of the modeled object and bounded by a planar extension of the triangles that join at said edge;
    (ii) determining a subset of the triangles such that, for a current position of each such triangle, motion between that current position and any subsequent or preceding position comprises motion along a trajectory directed through the interior of the modeled object;
    (iii) generating a trace of the motion of said subset of edges between said current and said next positions; and
  constructing a representation of the swept volume from the generated traces of the motion of said subset of edges
  wherein constructing a representation of the swept volume further comprises bounding the swept volume at each of said current positions in said series by said subset of triangles associated with each such current position.

10. The method of claim 9 where trajectory of motion of said triangles is approximated by analysis of motion of a point on the surface of the triangle.

11. A method for use in calculation of a swept volume of a computer generated model of a real-world object, the method comprising:

generating a three dimensional polyhedral representation of the model of the real-world object, the representation comprising a plurality of triangles joined at their edges, said triangles forming a tessellated representation of the modeled real-world object;

representing three dimensional motion of the modeled object by a series of sequential positions of the modeled object in three dimensional space; and for each position in the series of sequential positions of the modeled object, (i) determining a subset of the edges such that each edge in said subset has a trajectory through a corresponding first zone in which motion of the corresponding edge comprises motion on the boundary of the modeled swept volume during motion of the modeled object from a current position to a next position, where each such edge's corresponding first zone comprising a region external to the material of the modeled object and bounded by a planar extension of the triangles that join at said edge;

(ii) determining a subset of the triangles such that, for a current position of each such triangle, motion between that current position and any subsequent or preceding position comprises motion on a vector directed through the interior of the modeled object and where motion of the triangle along the vector is determined at a representative point on the surface of the triangle, motion of said representative point being used to approximate motion of said triangle;

(iii) generating a trace of the motion of said subset of edges between said current and said next positions; and constructing a representation of the swept volume from the generated traces of the motion of said subset of edges wherein constructing a representation of the swept volume further comprises bounding the swept volume at each of said current positions in said series by said subset of triangles associated with each such current position.

* * * * *